(12) United States Patent
Dueitt

(10) Patent No.: US 6,615,928 B2
(45) Date of Patent: Sep. 9, 2003

(54) POWERED GARDEN TOOL

(76) Inventor: Michele M. Dueitt, 1923 Spillway Rd. #221, Brandon, MS (US) 39047

( * ) Notice: Subject to any disclaimer, the term of this patent is extended or adjusted under 35 U.S.C. 154(b) by 0 days.

(21) Appl. No.: 09/837,367

(22) Filed: Apr. 19, 2001

(65) Prior Publication Data

US 2002/0153146 A1 Oct. 24, 2002

(51) Int. Cl.[7] .............................. A01B 33/00; A01B 1/00
(52) U.S. Cl. .......................... 172/41; 172/371; 172/378; 30/165; 30/500
(58) Field of Search ................................ 172/378, 373, 172/381, 25, 371, 41; 294/55, 49; 30/165, 500, 300; D15/12

(56) References Cited

U.S. PATENT DOCUMENTS

| | | | |
|---|---|---|---|
| 2,492,035 A | * | 12/1949 | Doble |
| 3,129,771 A | * | 4/1964 | Lidstone |
| 4,214,538 A | | 7/1980 | Druskin et al. |
| D292,865 S | | 11/1987 | Scott |
| 5,060,997 A | * | 10/1991 | Plecki .......................... 172/25 |
| D352,873 S | | 11/1994 | Chen |
| 5,765,648 A | | 6/1998 | Sheehan |
| 5,810,093 A | * | 9/1998 | Howard ...................... 172/111 |
| 5,887,283 A | | 3/1999 | MacKay |
| 6,050,344 A | * | 4/2000 | Larson et al. ................. 172/25 |
| 6,073,702 A | * | 6/2000 | Petruzzelli .................. 172/373 |

* cited by examiner

Primary Examiner—Thomas B. Will
Assistant Examiner—Alicia Torres
(74) Attorney, Agent, or Firm—Peter A. Borsari

(57) ABSTRACT

A powered garden tool is provided comprising a handle member having a power unit disposed therein and a digging attachment having a first end rotatably and detachably securable to the handle member and a second end having at least two cutting blade members secured thereto. In an alternative embodiment, the powered garden tool is in the form of a digging attachment which can be rotatably and detachably securable to a hand-held power tool, such as a power drill or cordless screwdriver.

18 Claims, 3 Drawing Sheets

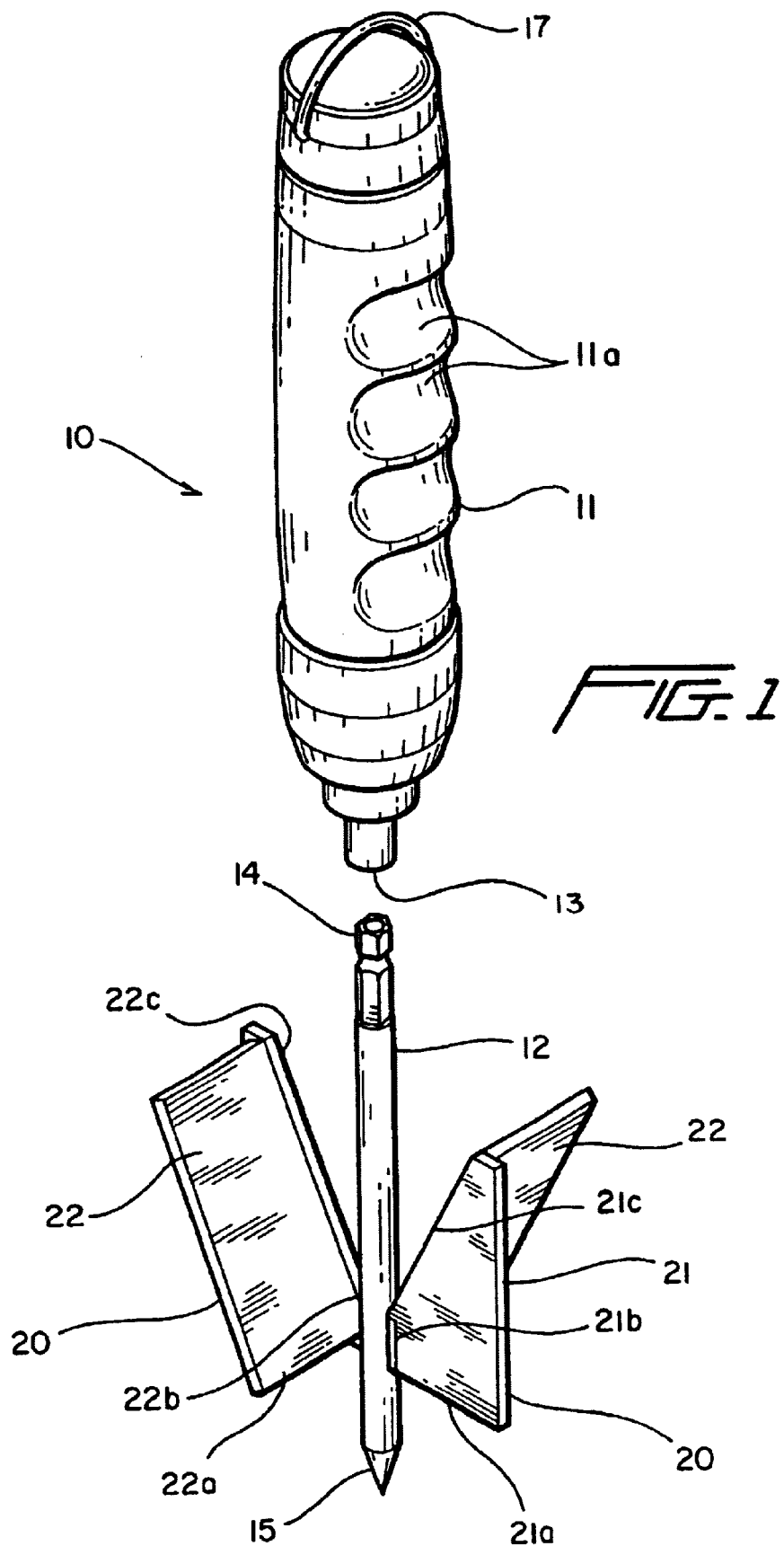

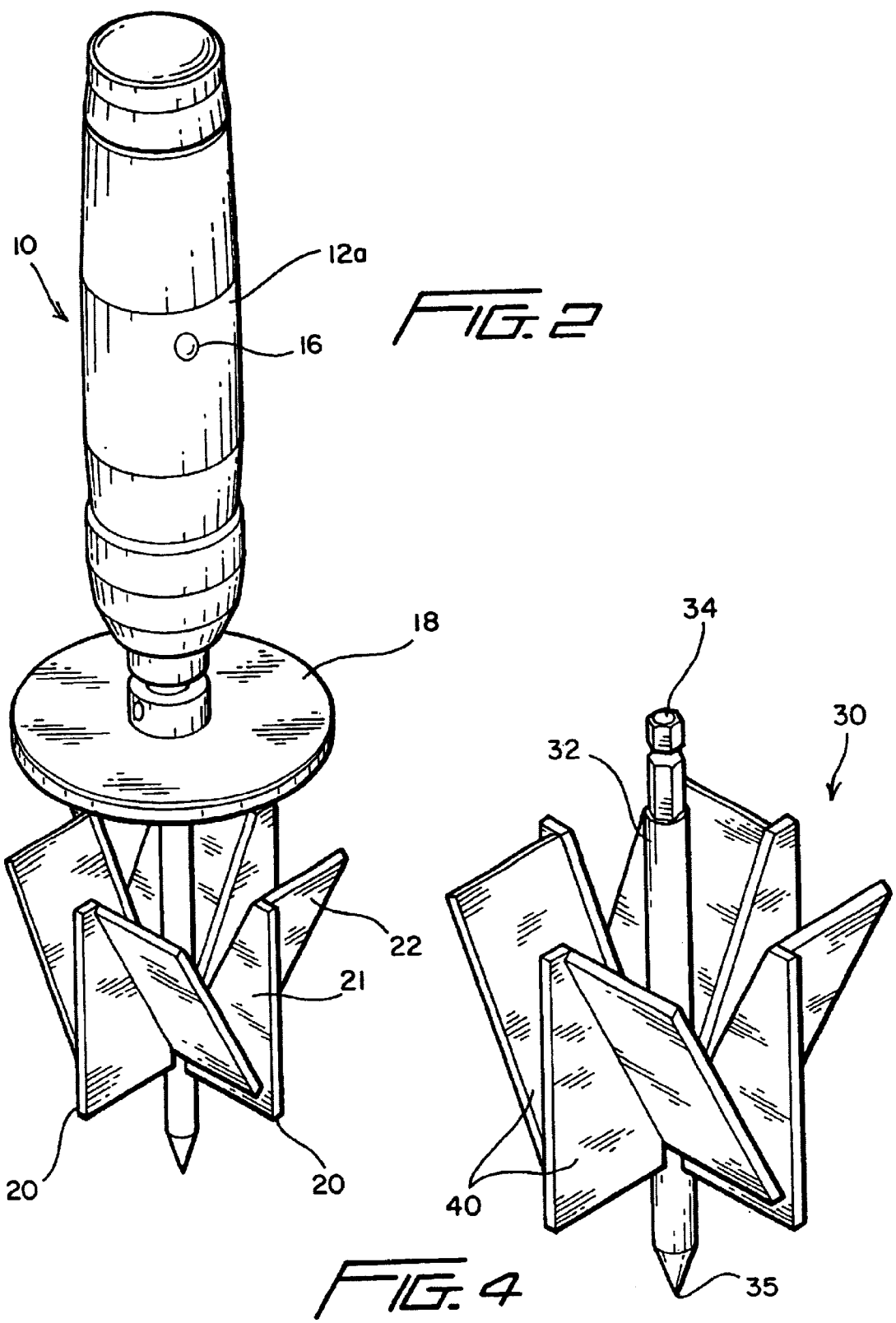

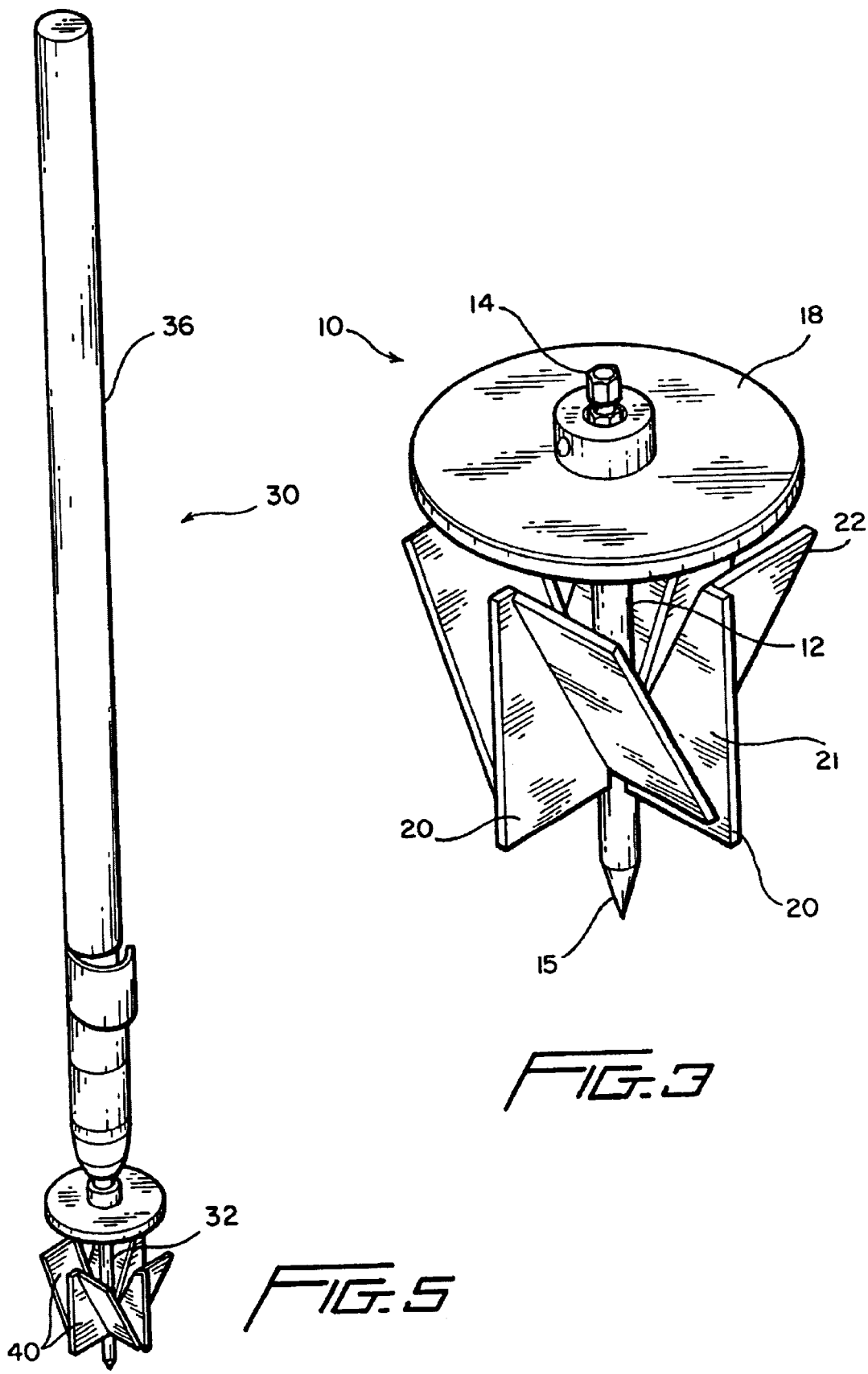

ured Nov. 24,

POWERED GARDEN TOOL

FIELD OF INVENTION

The present invention relates in general to the field of garden tools. More particularly, the present invention relates to a powered garden tool to facilitate digging holes in soil, such as a garden or planting bed.

BACKGROUND OF THE INVENTION

The prior art is replete with garden tools and similar devices for digging holes in soil for setting bedding plants, bulbs and the like. The most common garden tool for digging small holes is the simple hand shovel or gardening trowel. There are significant drawbacks to the hand shovel/gardening spade. For example, it can be difficult to remove soil from the bottom of the digging hole with such a tool. Moreover, when the soil is densely packed, penetrating the soil can be laborious, requiring an excessive amount of strength and endurance. In addition, the resulting holes usually are poorly shaped and require the removal of more soil than necessary in order to set the bedding plant or bulb. An example of a typical garden trowel is illustrated by Design U.S. Pat. No. D292,865 to Scott, issued Nov. 24, 1987. More elaborate garden tools have been developed having serrated edges and/or curved ends in order to facilitate penetrating the soil, as illustrated by Design U.S. Pat. No. D352,873 to Chen, issued Nov. 29, 1994 and U.S. Pat. No. 5,765,648 to Sheehan et al., issued Jun. 16, 1998. However, the use of such garden trowels oftentimes requires excessive strength and energy, and still result in poorly formed holes.

Another type of garden tool which has been utilized for digging holes is the garden claw, characterized as having several soil-contacting fingers or prongs. Although the garden claw does facilitate penetrating the soil to some extent, it is difficult to establish a properly formed hole when using a garden claw. In addition, it is quite difficult to remove soil from the hole and the use of the garden claw requires strength and energy. Examples of modified garden claws are shown in U.S. Pat. No. 4,214,538 to Druskin et al., issued Jul. 29, 1980 and U.S. Pat. No. 5,887,283 to Mackay, issued Mar. 30, 1999.

Another type of tool used for digging in soil is the bladed garden tool. The incorporation of one or more blades facilitates the penetration of densely packed soil. Nonetheless, a good amount of strength must be used with the bladed tool, and the user can expend a great deal of energy in digging multiple holes. Moreover, such tools do not provide that the soil will be removed easily from the hole nor are the resulting holes necessarily guaranteed to be formed any better than with the common garden trowel. Examples of bladed garden tools include U.S. Pat. No. 6,050,344 to Larson et al., issued Apr. 18, 2000 and U.S. Pat. No. 6,073,702 to Petruzzelli, issued Jun. 13, 2000.

Despite the numerous garden tools shown in the prior art and commercially available, a need still exists for a garden tool that will facilitate digging holes in soil, including soil that is difficult to penetrate. Such a garden tool should enable the user to plant a reasonably large quantity of bedding plants without regard to the user's strength and should require minimal effort and energy. Such a garden tool also should facilitate the formation of properly shaped holes. Moreover, such a tool should be capable of removing soil from the hole. In addition, such a garden tool should be of simple construction and inexpensive to manufacture, light-weight and easy to use.

SUMMARY OF THE INVENTION

Accordingly, it is an object of the present invention to provide a powered garden tool having at least two cutting blade members which facilitates the digging of a hole in soil.

It is also an object of the present invention to provide a powered garden tool having a plurality of cutting blades which facilitates the digging of a hole in soil and which removes soil from the hole.

It is another object of the present invention to provide a powered garden tool having more than one type of cutting blade members, such that said more than one type of cutting blade members can be interchanged with one another to accommodate different soil types.

It is a further object of the present invention to provide a powered garden tool attachment which can be detachably secured to a hand-held power tool.

It is an additional object of the present invention to provide a powered garden tool which enables a user to plant a reasonably large quantity of bedding plants without regard to the user's strength and which requires the user to expend minimal effort and energy.

It is still another object of the present invention to provide a powered garden tool that reduces user fatigue and reduces the time required to complete a planting.

It is yet another object of the present invention to provide a powered garden tool which is of simple construction and inexpensive to manufacture, light-weight and easy to use.

Additional objects, advantages and novel features of the invention will be set forth in part of the description which follows, and in part will become apparent to those skilled in the art upon examination of the following specification or may be learned by practice of the invention.

These and other objects of the present invention are achieved by providing a powered garden tool having a handle member, a power unit disposed within said handle member, an elongated shaft having a first end rotatably and detachably securable to said handle member and a distal second end, and at least two cutting blade members secured to said second end of said first elongated shaft.

BRIEF DESCRIPTION OF THE DRAWINGS

The present invention will be better understood with reference to the appended drawing sheets, wherein:

FIG. 1 is an exploded side perspective view of the powered garden tool of the present invention.

FIG. 2 is a side perspective view of the powered garden tool of the present invention having an alternative handle member.

FIG. 3 is a side perspective view of the powered garden tool of the present invention showing four cutting blade members and a shield.

FIG. 4 is a side perspective view of the present invention in the form of a garden tool attachment for use in combination with a power tool.

FIG. 5 is a side perspective view of the present invention in the form of a garden tool attachment having an extended shaft for use in combination with a power tool.

DETAILED DESCRIPTION

The present invention relates to a hand-held powered garden tool which facilitates digging holes in the ground, such as a garden or planting bed. Referring to FIG. 1, the powered garden tool 10 comprises a handle member 11 having a power unit disposed therein, and a digging attachment in the form of an elongated shaft 12 having a first end 14 rotatably and detachably secured to the handle member 11 and a second end 15, and at least two cutting blade members 20, secured to the second end 15 of the elongated shaft 11. The handle member 11 can be of any shape and size which enables a user to grip and hold the handle member. In one embodiment, shown in FIG. 1, the handle member is provided with a plurality of finger grips 11a. In another embodiment, shown in FIG. 2, the handle member 12a is in the form of a cylindrical shaft, such as a cylindrical shaft typically used on cordless screwdrivers. The handle member can be constructed from an suitable material, including for example, plastic, metal, plastic covered metal, rubber, and combinations thereof.

The handle member 11 has a power unit disposed therein (not shown). The power unit is preferably in the form of a rechargeable battery unit conventionally used with many cordless tools as will be obvious to those skilled in the art. An off/on switch 16, such as a push button 16 is disposed on the handle member 11, the on/off switch being electrically connected to the power unit in order to activate and deactivate the powered garden tool. A loop 17 may be provided on the handle member to facilitate storing the powered garden tool when not in use. Optionally, the powered garden tool may be provided with a shield 18, concentrically disposed near the first end of the elongated shaft, as shown in FIG. 3. The use of a shield functions to protect the user, particularly the user's hand(s) from the cutting blade members. The shield also assists in deflecting soil being removed from the ground from the user. The shield can be composed of any durable material and preferably is composed of a transparent plastic material. The shield should be of suitable shape and size capable of protecting the user and deflecting soil. Preferably, the shield is in the form of a disk which extends outwardly from the elongated shaft and over the tips of the cutting blades.

The elongated shaft 12 is rotatably and detachably secured to the handle member in any suitable manner as will be known to those skilled in the art. In one embodiment, shown in FIG. 1, the elongated shaft 12 comprises a first end 14 which is configured to cooperatively engage an opening 13 in the handle member 11 such that the first end is retained therein. The first end 14 may be detachably secured to the handle member 11 by a simple snap-fit arrangement. Alternatively, the opening 13 may be in the form of a chuck configured to receive and retain the first end of the elongated shaft. The elongated shaft may be constructed of any strong, durable material, a suitable example of which includes a metal or metal alloy compound.

At least two cutting blade members 20 are secured to the second end 15 of the elongated shaft. The cutting blade members may be manufactured from a hard plastic injection molding or metal casting. Each cutting blade member may be of any suitable shape, size, angle and pitch sufficient to penetrate the ground and establish a hole therein. In one embodiment, shown in FIG. 1, each cutting blade member consists of a vertical winged cutting blade member 21 having a horizontal ground-engaging blade edge 21a, a first shaft-securing planar edge 21b extending upwardly from said horizontal ground engaging blade edge 21a and a first slanted edge 21c extending outwardly and away from said elongated shaft. Angled cutting blade member 22 has an angular ground engaging blade edge 22a angularly disposed from said elongated shaft, a second shaft-securing planar edge 22b extending upwardly from said angular ground-engaging blade and a second slanted edge 21c extending outwardly and away from said elongated shaft in such a manner that cutting blade members 21 and 22 are joined by joining said first slanted edge with said second slanted edge. Extensive experimentation has found that a cutting blade member having a vertical blade joined to an angled cutting blade is exceptionally efficient at penetrating the ground and removing the soil therefrom. However, as it is well established that various types of soil exist, having different densities and compactness, the present invention contemplates the use of different types of cutting blade members for different types of soils. For example, a more shallow angled blade may be used for compact soil while steeper angled blades may be used for looser soil. In order to accommodate various soil types, the powered garden tool of the present invention may be provided with multiple digging attachments having different angled blades thereon.

The powered garden tool of the present invention may be provided with more than two cutting blade members 20. Referring in particular to FIGS. 2 and 3, four (4) cutting blade members 20 are secured to the second end 15 of the elongated shaft 12. In the embodiment as illustrated, each cutting blade member is provided with a vertical cutting blade 21 joined to an angled cutting blade 22. However, it is to be understood that not all four (4) cutting blade members have to be identical in shape, size or angle.

The powered garden tool of the present invention also may be in the form of a digging attachment which is rotatably and detachably securable to a power tool, preferably a hand-held power tool such as a power drill, cordless screwdriver or similar power tool having a chuck. Referring to FIG. 4, the digging attachment 30 comprises an elongated shaft 32 having a first end 34 and a second end 35 having at least two cutting blades 40 secured thereto. The first end 34 of the elongated shaft is configured in such a manner that it can be retained and held within the chuck of a conventional power tool. The digging attachment may be provided with an extended shaft or handle 36 as shown in FIG. 5, such that the user can be in a standing position while digging a hole.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A powered garden tool comprising:
   (a) a handle member having a power unit disposed therein, and
   (b) a first digging attachment comprising:
      (1) an elongated shaft having a first end rotatably and detachably securable to said handle member and a distal second end, and
      (2) at least two soil excavating members secured to said second end of said elongated shaft, each of said at least two soil excavating members consisting of:
   (c) a vertical winged cutting blade member having a horizontal ground-engaging blade edge perpendicularly disposed to said elongated shaft, a first shaft-securing planar edge extending upwardly from said horizontal ground-engaging blade edge and a first slanted edge extending outwardly and away from said elongated shaft, and
   (d) an angle winged cutting blade member having an angular ground-engaging blade edge angularly disposed from said elongated shaft, a second shaft-securing planar edge extending upwardly from said angular ground-engaging blade and a second slanted edge extending outwardly and away from said elongated shaft, wherein said first slanted edge is joined to said second slanted edge, thereby joining said vertical winged cutting blade member and said angle winged cutting blade member.

2. The powered garden tool in accordance with claim 1, wherein said at least two soil excavating members consists of four (4) soil excavating members, each soil excavating member having an angle winged cutting blade member and a vertical winged cutting blade member.

3. The powered garden tool in accordance with claim 2, wherein said four (4) soil excavating members are arranged concentrically about said second end of said elongated shaft.

4. The powered garden tool in accordance with claim 1, wherein activation of said power unit causes said digging attachment to rotate.

5. The powered garden tool in accordance with claim 4, further comprising activation means disposed on said handle member to activate said power unit.

6. The powered garden tool in accordance with claim 5, wherein said activation means is an on/off switch.

7. The powered garden tool in accordance with claim 4, wherein rotation of said digging attachment causes said at least two soil excavating members to rotate.

8. The powered garden tool in accordance with claim 7, wherein the rotation of said at least two soil excavating members is of sufficient speed to cause each of said soil excavating members to penetrate a section of ground and excavate soil from said section of ground, thereby creating a hole.

9. The powered garden tool in accordance with claim 8, wherein said at least two soil excavating members is four (4) soil excavating members, each soil excavating member having an angle winged cutting blade member and a vertical winged cutting blade member, said four soil excavating members being arranged concentrically about said second end of said elongated shaft in such a manner that when said elongated shaft is rotated a sufficient speed, said four soil excavating members are capable of penetrating a section of ground and excavating soil from said section of ground, thereby creating a hole.

10. The powered garden tool in accordance with claim 1, further comprising a second digging attachment in the form of an elongated shaft having a first end rotatably and detachably securable to said handle member and a second end having at least two soil excavating members secured thereto, said second digging attachment being interchangeable with said first digging attachment.

11. The powered garden tool in accordance with claim 1, further comprising a shield concentrically disposed near said first end of said elongated shaft.

12. In combination with a rotary, hand-held power tool having a chuck for holding attachments, a garden tool attachment comprising:

(a) an elongated shaft having a first end rotatably and detachably securable to said chuck of said power tool and a distal second end, and (b) at least two soil excavating members secured to said second end of said elongated shaft, each of said at least two soil excavating members consisting of:

(c) a vertical winged cutting blade member having a horizontal ground-engaging blade edge perpendicularly disposed to said elongated shaft, a first shaft-securing planar edge extending upwardly from said horizontal ground-engaging blade edge and a first slanted edge extending outwardly and away from said elongated shaft, and (d) an angle winged cutting blade member having an angular ground-engaging blade edge angularly disposed from said elongated shaft, a second shaft-securing planar edge extending upwardly from said angular ground-engaging blade and a second slanted edge extending outwardly and away from said elongated shaft, wherein said first slanted edge is joined to said second slanted edge, thereby joining said vertical winged cutting blade member and said angle winged cutting blade member, and wherein rotation of said at least two soil excavating members is of sufficient speed to cause each of said soil excavating members to penetrate a section of ground and excavate soil from said section of ground, thereby creating a hole.

13. The combination of a rotary, hand-held power tool having a chuck for holding attachments, and a garden tool attachment in accordance with claim 12, wherein each of said at least two soil excavating members consists of an angle winged cutting blade member and a vertical winged cutting blade member.

14. The combination of a rotary, hand-held power tool having a chuck for holding attachments, and a garden tool attachment in accordance with claim 13, wherein said at least two soil excavating members consists of four (4) soil excavating members.

15. The combination of a rotary, hand-held power tool having a chuck for holding attachments, and a garden tool attachment in accordance with claim 12, wherein said four (4) soil excavating members are arranged concentrically about said second end of said elongated shaft.

16. The combination of a rotary, hand-held power tool having a chuck for holding attachments, and a garden tool attachment in accordance with claim 15, wherein said four soil excavating members are arranged concentrically about said second end of said elongated shaft in such a manner that when said elongated shaft is rotated a sufficient speed, said four soil excavating members are capable of penetrating a section of ground and excavating soil from said section of ground, thereby creating a hole.

17. The combination of a rotary, hand-held power tool having a chuck for holding attachments, and a garden tool attachment in accordance with claim 16, wherein said power tool is a cordless electric screwdriver.

18. The combination of a rotary, hand-held power tool having a chuck for holding attachments, and a garden tool attachment in accordance with claim 13, wherein said power tool is a cordless electric screwdriver.

* * * * *